(12) United States Patent
Yara et al.

(10) Patent No.: US 11,194,686 B2
(45) Date of Patent: Dec. 7, 2021

(54) DATA AGNOSTIC MONITORING SERVICE

(71) Applicant: ADP, LLC, Roseland, NJ (US)

(72) Inventors: Amarnath Yara, New York, NY (US); Nick Heasman, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/657,283

(22) Filed: Oct. 18, 2019

(65) Prior Publication Data

US 2021/0117299 A1  Apr. 22, 2021

(51) Int. Cl.
*G06F 11/30* (2006.01)
*G06F 11/07* (2006.01)
*G06F 11/34* (2006.01)

(52) U.S. Cl.
CPC ........ *G06F 11/302* (2013.01); *G06F 11/0772* (2013.01); *G06F 11/3055* (2013.01); *G06F 11/3072* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 7,930,681 B2* | 4/2011 | Kloeffer | G06F 8/65 717/120 |
| 7,954,062 B2* | 5/2011 | Bright | G06F 11/0715 715/772 |
| 8,112,747 B2* | 2/2012 | Haeberle | G06F 9/542 717/172 |
| 8,468,502 B2* | 6/2013 | Lui | G06F 11/3636 717/127 |
| 2018/0203795 A1* | 7/2018 | Gadiya | G06F 11/3495 |
| 2020/0112497 A1* | 4/2020 | Yenumulapalli | H04L 41/5009 |
| 2020/0233779 A1* | 7/2020 | Kroehling | G06F 11/3636 |
| 2021/0042321 A1* | 2/2021 | Xu | G06F 16/27 |
| 2021/0117299 A1* | 4/2021 | Yara | G06F 11/0772 |

OTHER PUBLICATIONS

Cinque, "Microservices Monitoring with Event Logs and Black Box Execution Tracing", 2019, IEEE (Year: 2019).*
Palm, "Syntactic Translation of Message Payloads Between at Least Partially Equivalent Encodings", 2019, IEEE (Year: 2019).*
Cinque et al., "Real-time monitoring of microservices-based software systems," 2016/2017, Universita' Degli Studi Di Napoli Federico II, 87 pages.

* cited by examiner

*Primary Examiner* — Hossain M Morshed
(74) *Attorney, Agent, or Firm* — Yee & Associates, P.C.

(57) ABSTRACT

A method, computer system, and computer program product for managing application availability in a micro services environment. A monitoring application listens for an event message that indicates an unavailability of critical data. The monitoring application receives the event message over a message pipeline. The monitoring application is critical data agnostic, such that the monitoring application is unaware of the critical data required by the monitored application. Responsive to receiving the event message, the monitoring application interprets the event information within the execution context of the monitored application. The monitoring application identifies a status of the monitored application based on the interpreted event information. The monitoring application updates a status indicator of the monitored application within the execution context, but not within other execution contexts of the monitored application.

21 Claims, 12 Drawing Sheets

| Client Management | Dashboard | Clients | Administrators | Implementations | Business Mini Apps |

Clients ( All Clients )  ( Your Clients )  ( Client App Health )

Client App Health
View the readiness of apps to clients by country.

Client                          Country
[ Search... 🔍 ]    [ Search... 🔍 ]

| Name (63) | Database Ready ⓘ | HR Ready ⓘ | Payroll Ready ⓘ | Compliance Ready ⓘ | Compensation Ready ⓘ |
|---|---|---|---|---|---|
| ▷ XYZ Live | Yes | Yes | Yes | Yes | Yes |
| ▷ XYZ Private Limited | Yes | Yes | Yes | Yes | Yes |
| ▽ XYZR Test Client | Yes | Yes | Yes | Multiple Statuses | Not Eligible |

| Country | | HR Ready | Payroll Ready | Compliance Ready | Compensation Ready |
|---|---|---|---|---|---|
| United States | | Yes | Yes | Yes | Not Eligible |
| Canada | | Yes | Yes | No ▼ | Not Eligible |
| Australia | | Yes | Yes | No ▼ | Not Eligible |
| Great Britain | | Yes | Yes | No ▼ | Not Eligible |

| | | | | | |
|---|---|---|---|---|---|
| ▷ Authorization Test Client | Yes | Yes | Yes | Not Eligible | Not Eligible |
| ▷ BAT Client | Yes | Yes | Yes | Not Eligible | Not Eligible |
| ▷ CLM BMA TMA Test | Yes | Yes | Yes | Not Eligible | Not Eligible |
| ▷ EXL Demo | No ▼ | Database Error | Database Error | Database Error | Database Error |
| ▷ Conference 2018 | Yes | No ▼ | HR Error | HR Error | HR Error |
| ▷ Group Canada | Yes | Yes | No ▼ | Payroll Error | Payroll Error |
| ▷ Group Live | Yes | Yes | Yes | Yes | Yes |

[ No ▼ ]
    Retry Database Provisioning
    View Errors
    View Activity Log

[ No ▼ ]
    Disable App
    View Errors
    View Activity Log

| | Reports | Billing | Templates | | | |
|---|---|---|---|---|---|---|
| | Time Off Ready ⓘ | Time On Ready ⓘ | Benefits Ready ⓘ | Talent Ready ⓘ | Rollout Ready ⓘ | |
| | Yes | Yes | Yes | Yes | Yes | ... |
| | Not Eligible | Not Eligible | Not Eligible | Yes | Yes | ... |
| | Not Eligible | Not Eligible | Not Eligible | Not Eligible | Multiple Statuses | ... |
| | Time Off Ready | Time On Ready | Benefits Ready | Talent Ready | Rollout Ready | |
| | Not Eligible | Not Eligible | Not Eligible | Not Eligible | Yes | ... |
| | Not Eligible | Not Eligible | Not Eligible | Not Eligible | No | ... |
| | Not Eligible | Not Eligible | Not Eligible | Not Eligible | No | ... |
| | Not Eligible | Not Eligible | Not Eligible | Not Eligible | No | ... |
| | Not Eligible | Not Eligible | Not Eligible | Not Eligible | Yes | ... |
| | Not Eligible | Not Eligible | Not Eligible | Not Eligible | Yes | ... |
| | Not Eligible | Not Eligible | Not Eligible | Not Eligible | Yes | ... |
| | Database Error | Database Error | Database Error | Database Error | No | ... |
| | HR Error | HR Error | HR Error | HR Error | No | ... |
| | Payroll Error | Payroll Error | Payroll Error | Payroll Error | No | ... |
| | Yes | Yes | Yes | Yes | Yes | ... |

1 2 3 ... 12 ◁ ▷

View Implementation
View Errors
View Activity Log

DATA AGNOSTIC MONITORING SERVICE

BACKGROUND INFORMATION

1. Field

The present disclosure relates generally to computer applications running in an information processing system and to the communication of information between such applications. More particularly, illustrative embodiments are related to the communication of event information for business events between applications in a computer-implemented human capital management system.

2. Background

An application is a computer program that is designed to run on a data processing system to perform a group of coordinated functions, tasks, or activities for the benefit of a user. An application also may be referred to as an app, an application program, or a software application.

An organization, such as a business entity or another appropriate organization, may use a variety of different applications to perform a variety of different actions. For example, a business organization may use a variety of different applications to perform a variety of different actions related to human capital management. Human capital management also may be referred to as human resource management.

An application may perform particular actions in response to receiving a particular input. For example, client services monitoring an application may perform particular actions to prevent data corruption when monitored services become unavailable. However, currently available monitoring services and applications require intimate knowledge of the monitored applications.

Accordingly, it would be beneficial to have a method and apparatus that take into account one or more of the issues discussed above, as well as other possible issues. For example, it would be beneficial to have a method and apparatus for effectively providing information to a variety of different applications that may use the information to perform a variety of different actions. More particularly, it would be beneficial to have a method and apparatus for effectively providing application monitoring services to a variety of different applications that perform a variety of different actions without requiring knowledge of the monitored application or data.

SUMMARY

The illustrative embodiments provide a method of managing application availability in a micro services environment. A monitoring application listens for an event message that indicates an unavailability of critical data that is required by a monitored application. The event message comprises an event name and a message payload. The message payload comprises event information that indicates the monitored application and an execution context of the monitored application. The monitored application comprises a first set of data nodes that are composed into a first structured data object according to a domain specific language. The monitoring application receives the event message over a message pipeline. The monitoring application is critical data agnostic, such that the monitoring application is unaware of the critical data required by the monitored application. The monitoring application comprises a second set of data nodes that are composed into a second structured data object according to the domain specific language. Responsive to receiving the event message, the monitoring application interprets the event information within the execution context of the monitored application. The monitoring application identifies a status of the monitored application based on the event information interpreted by the monitoring application. The monitoring application updates a status indicator of the monitored application within the execution context, but not within other execution contexts of the monitored application.

The illustrative embodiments also provide a computer system for managing application availability in a micro services environment. The computer system includes a set of hardware processors. The computer system further includes a monitored application comprising a first set of data nodes that are composed into a first structured data object according to a domain specific language. The computer system further includes a monitoring application comprising a second set of data nodes that are composed into a second structured data object according to the domain specific language. The monitoring application is configured to listen for an event message that indicates an unavailability of critical data that is required by a monitored application. The event message comprises an event name and a message payload. The message payload comprises event information that indicates the monitored application and an execution context of the monitored application. The monitoring application is configured to receive the event message over a message pipeline. The monitoring application is critical data agnostic, such that the monitoring application is unaware of the critical data required by the monitored application. The monitoring application is configured to interpret the event information within the execution context of the monitored application in response to receiving the event message. The monitoring application is configured to identify a status of the monitored application based on the event information interpreted by the monitoring application. The monitoring application is configured to update a status indicator of the monitored application within the execution context, but not within other execution contexts of the monitored application.

The illustrative embodiments also provide a computer program product for managing application availability in a micro services environment. The computer program product comprises a non-transitory computer-readable storage medium having program code stored thereon. The program code includes code for listening for an event message that indicates an unavailability of critical data that is required by a monitored application. The event message comprises an event name and a message payload. The message payload comprises event information that indicates the monitored application and an execution context of the monitored application. The monitored application comprises a first set of data nodes that are composed into a first structured data object according to a domain specific language. The program code includes code for receiving the event message by the monitoring application. The monitoring application receives the event message over a message pipeline. The monitoring application is critical data agnostic, such that the monitoring application is unaware of the critical data required by the monitored application. The monitoring application comprises a second set of data nodes that are composed into a second structured data object according to the domain specific language. The program code includes code for interpreting the event information within the execution context of the monitored application in response to receiving the event message. The program code includes code for identifying a status of the monitored application based on the event information interpreted by the monitoring application. The program code includes code for updating a status indicator of the monitored application within the execution context, but not within other execution contexts of the monitored application.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, objectives, and features thereof, will best be understood by reference to the following detailed description of an illustrative embodiment of the present disclosure when read in conjunction with the accompanying drawings, wherein:

FIGS. 13A-3B are an application health page of a graphical user interface in accordance with an illustrative embodiment.

DETAILED DESCRIPTION

Figure 1:
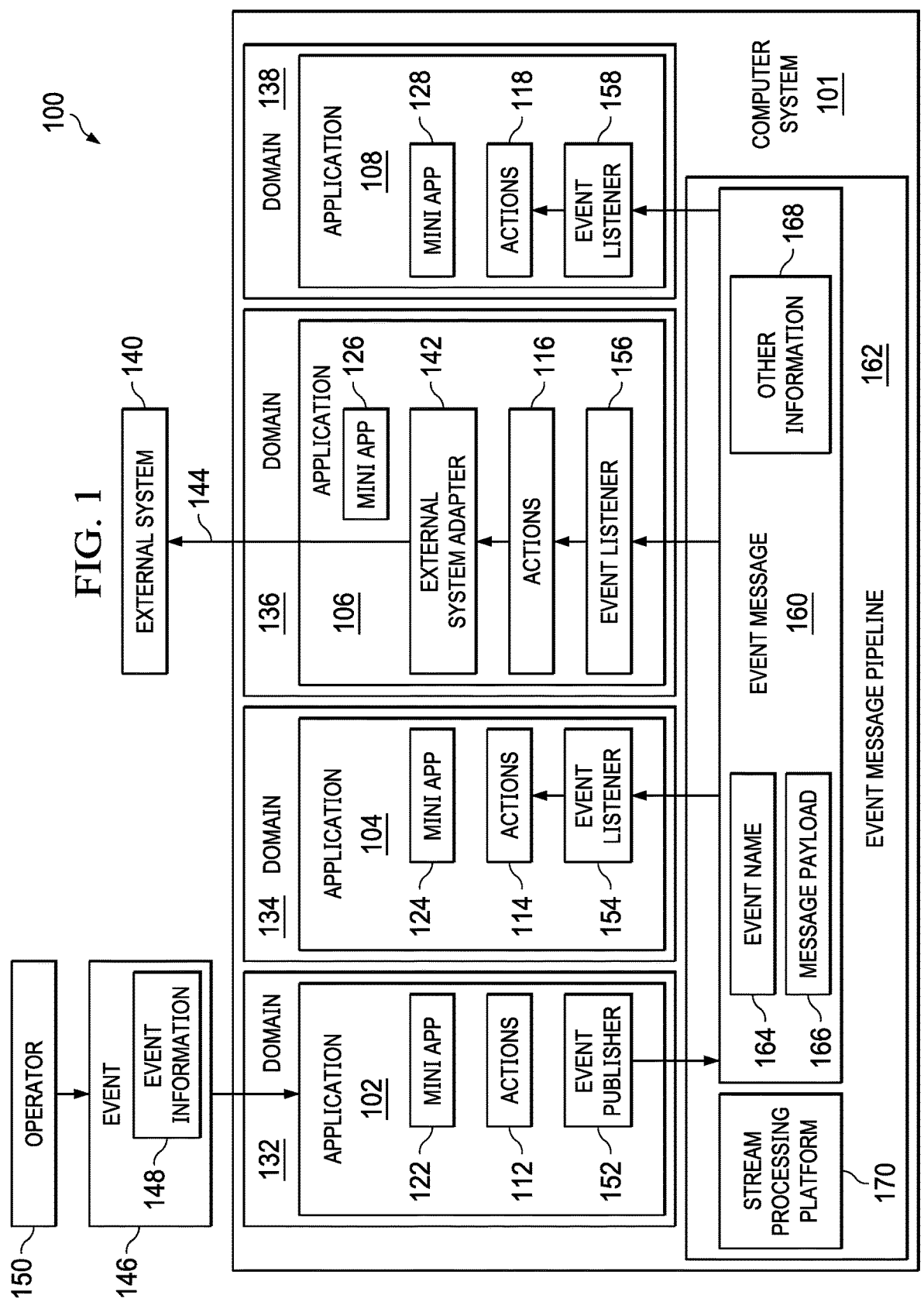
FIG. 1 is an illustration of a block diagram of an event communication environment in accordance with an illustrative embodiment.

The different illustrative embodiments recognize and take into account a number of different considerations. As used herein, a "number of," when used with reference to items, means one or more items. For example, a "number of different considerations" is one or more different considerations.

The illustrative embodiments recognize and take into account that a business organization or other entity may use various different applications running on an information processing system to perform various different actions. "Actions" performed by an application also may be referred to as functions, tasks, or activities. For example, without limitation, a business organization may use a plurality of different applications to perform various different actions in a computer implemented system for human capital management.

The illustrative embodiments recognize and take into account that a variety of different applications in use by an organization may perform a variety of different actions in response to the occurrence of the same event. Therefore, it is desirable that information regarding the occurrence of the event is provided effectively to the various different applications that perform actions in response to the occurrence of the event. For example, one application for performing actions in response to the occurrence of an event may receive event information regarding the occurrence of the event. In this case, it is desirable that the event information received by the one application is communicated effectively to other applications that perform other actions in response to the event.

The illustrative embodiments provide a method and system for communicating information between computer applications using a publication and subscription model. In accordance with an illustrative embodiment, an application that receives information as input to perform an action also may publish that information for use by other applications. Other applications may listen for the publication of the information by the first application and receive the published information to perform different actions using the information. For example, without limitation, the information received and published by the first application, and used by the first application and the other applications to perform various different actions, may be event information regarding the occurrence of an event.

For example, without limitation, illustrative embodiments provide a system and method for the communication of event information regarding the occurrence of business events between applications for performing various different actions in a computer implemented human capital management system. For example, without limitation, illustrative embodiments may provide for the communication of event information regarding the occurrence of business events between a plurality of miniapps for performing various different actions in a computer implemented human capital management system. In accordance with an illustrative embodiment, multiple actions may be grouped together in a miniapp as one business event.

The illustrative embodiments recognize and take into account that the communication of event information between applications for performing different actions using the event information may be achieved by relatively tight coupling between the applications running in an information processing system. However, the illustrative embodiments also recognize and take into account that it may be desirable to have a relatively looser coupling between applications to improve the scalability and resiliency of the system architecture. Looser coupling between applications may support an increase in the complexity and quantity of applications that may be provided to perform a variety of actions in an information processing system.

The publication and subscription model for the communication of event information between applications in accordance with an illustrative embodiment provides for the communication of event information between applications using a loose coupling between applications. In accordance with an illustrative embodiment, the communication of event information between applications is provided without any direct dependencies between applications. Therefore, illustrative embodiments provide for the communication of event information between various applications that may be deployed independently.

Illustrative embodiments provide a distributed system for the communication of event information between applications. In accordance with an illustrative embodiment, an application that receives event information may publish the event information to communicate the event information to multiple subscribing applications at the same time. Therefore, multiple actions may be performed by multiple subscribing applications simultaneously.

Systems and methods for the communication of events between applications in accordance with an illustrative embodiment also provide for more easy integration with other applications. In accordance with an illustrative embodiment, both inbound and outbound business events may be exposed to externally developed applications, miniapps, or other products.

Turning to FIG. 1, an illustration of a block diagram of an event communication environment is depicted in accordance with an illustrative embodiment. Event communication environment 100 may be any appropriate environment in which a plurality of applications 102, 104, 106, and 108 are run to perform a plurality of corresponding actions 112, 114, 116, and 118. An event communication environment in accordance with an illustrative embodiment may include more or fewer applications to perform more or fewer actions than are illustrated as an example in FIG. 1. An event communication environment in accordance with an illustrative embodiment may include any appropriate number of applications to perform any appropriate number of actions.

One or more of applications 102, 104, 106, and 108 may be implemented as miniapps 122, 124, 126, and 128, respectively. For example, without limitation, one or more of applications 102, 104, 106, and 108 used to perform corresponding actions 112, 114, 116, and 118 by or for a business or other entity may be implemented as miniapps 122, 124, 126, and 128, respectively.

Miniapps 122, 124, 126, and 128 are relatively small or simple, discrete, user facing applications. For example, miniapp 122, 124, 126, or 128 may be configured to provide only one function or a few functions for a user. Miniapps 122, 124, 126, and 128 may be built using building blocks, as described, for example, in FIG. 2. In this example, building blocks are distinct, atomic units of functionality executable by a computer to perform a function. Multiple building blocks may be combined together to form miniapp 122, 124, 126, or 128. In some cases, miniapp 122, 124, 126, or 128 may be formed by a single building block.

Event communication environment 100 may be implemented in information processing system 101. Information processing system 101 is a hardware system that may comprise any appropriate system for running applications 102, 104, 106, and 108. For example, information processing system 101 may comprise one or more computers. Information processing system 101 may comprise a plurality of computers that may be connected in communication with each other by any appropriate local or distributed network.

Figure 14:
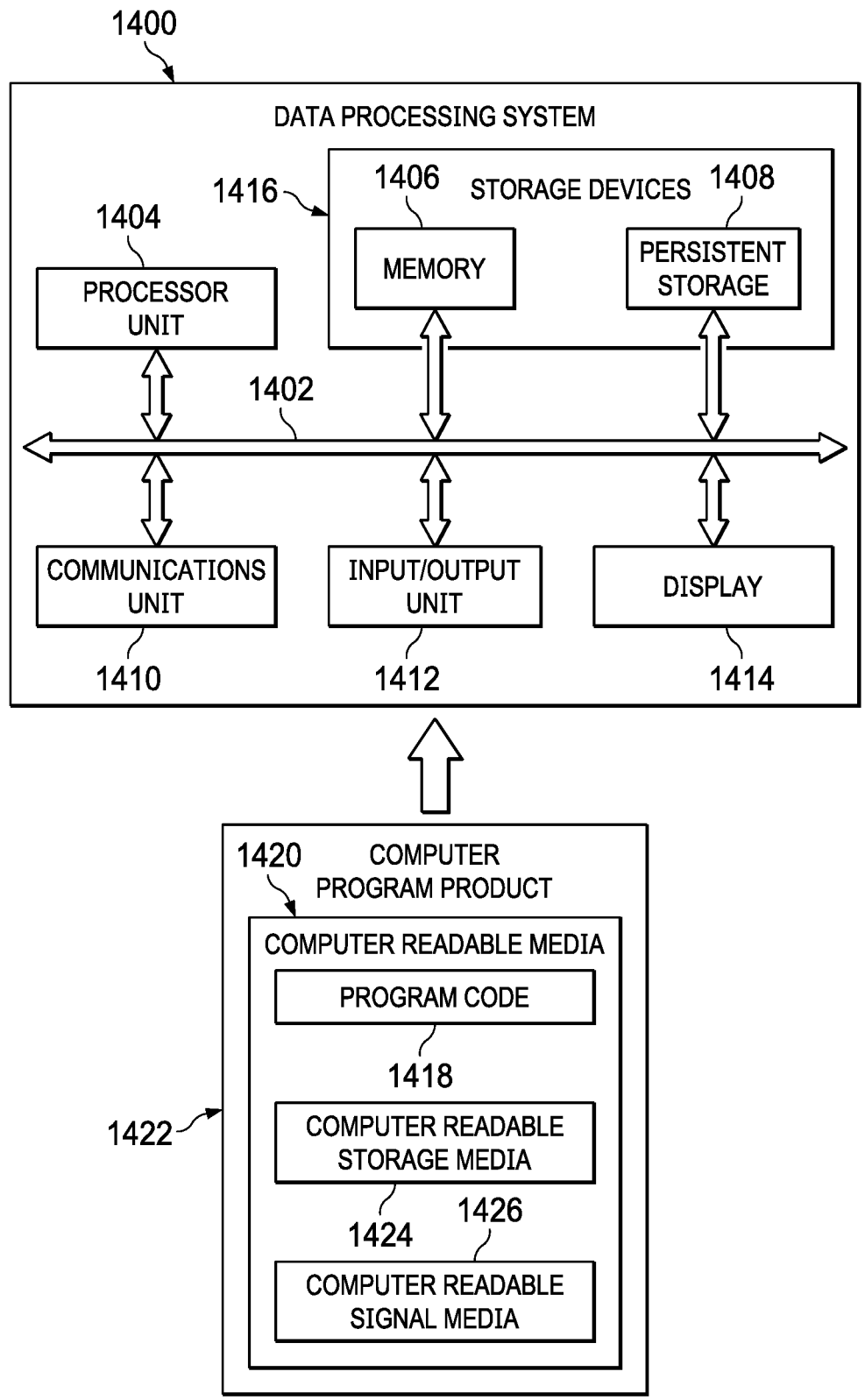
FIG. 14 is an illustration of a block diagram of a data processing system in accordance with an illustrative embodiment.

For example, without limitation, information processing system 101 may be implemented using data processing system 1400 in FIG. 14.

Information processing system 101 may be operated by or for any appropriate entity to perform any appropriate actions 112, 114, 116, and 118 for the entity. For example, without limitation, information processing system 101 may be operated by or for a business entity, a government entity, a military organization, a charitable organization, an educational organization, a scientific or research entity, or any other appropriate entity or combination of entities.

Applications 102, 104, 106, and 108 running in information processing system 101 may perform any corresponding actions 112, 114, 116, and 118 that are appropriate for the entity for which information processing system 101 is operated. For example, without limitation, when information processing system 101 is operated by or for a business entity, applications 102, 104, 106, and 108 may perform corresponding actions 112, 114, 116, and 118 that are related to managing the human resources of the business entity. In this case, applications 102, 104, 106, and 108 running on information processing system 101 may implement a human capital management system for the business entity.

In accordance with an illustrative embodiment, applications 102, 104, 106, and 108 perform corresponding actions 112, 114, 116, and 118 in different corresponding domains 132, 134, 136, and 138. Each of domains 132, 134, 136, and 138 may include corresponding application 102, 104, 106, or 108 for performing corresponding actions 112, 114, 116, or 118. Each of domains 132, 134, 136, and 138 may include one or more other applications, not shown in FIG. 1, for performing other actions in domain 132, 134, 136, or 138. The actions performed by the one or more applications with each of domains 132, 134, 136, and 138 may be relatively closely related to each other. For example, without limitation, the actions performed by the applications with each of domains 132, 134, 136, and 138 may be directed to similar or related tasks. However, the actions performed by the applications within each one of domains 132, 134, 136, and 138 are different from the actions performed by the applications within other ones of domains 132, 134, 136, and 138.

Therefore, in this example, actions 112 performed by application 102 in domain 132 are different from actions 114, 116, and 118 performed by corresponding applications 104, 106, and 108 in corresponding domains 134, 136, and 138. Actions 114 performed by application 104 in domain 134 are different from actions 112, 116, and 118 performed by corresponding applications 102, 106, and 108 in corresponding domains 132, 136, and 138. Actions 116 performed by application 106 in domain 136 are different from actions 112, 114, and 118 performed by corresponding applications 102, 104, and 108 in corresponding domains 132, 134, and 138. Actions 118 performed by application 108 in domain 138 are different from actions 112, 114, and 116 performed by corresponding applications 102, 104, and 106 in corresponding domains 132, 134, and 136.

One or more of actions 112, 114, 116, and 118 performed by one or more corresponding applications 102, 104, 106, and 108 may affect one or more systems that are external to information processing system 101 on which applications 102, 104, 106, and 108 are running. A system is external to information processing system 101 if it does not use the resources of information processing system 101 to perform actions. In other words, a system that is external to information processing system 101 would not be considered to be a part of information processing system 101 by a person of ordinary skill in the art.

For example, one or more of actions 116 performed by application 106 may affect external system 140. Actions 116 performed by application 106 may control the operation of external system 140 to perform an action or may affect the operation of external system 140 in any other appropriate manner. For example, without limitation, one or more of actions 116 performed by application 106 may generate a message or signal that may be provided to external system 140 to affect the operation of external system 140.

Application 106 may include external system adapter 142. External system adapter 142 may convert a message or signal generated by performing one or more of actions 116 by application 106 into an appropriate form for delivery to and use by external system 140. Alternatively, some or all of the functions performed by external system adapter 142 may be performed by external system 140 or by another system or function that is not part of application 106 or external system 140 and that may be implemented within or external to information processing system 101.

A message or signal generated by performing one or more of actions 116 by application 106 may be delivered to external system 140 via connection 144. Connection 144 may be a wired connection, a wireless connection, a fiber optic connection, or any other appropriate connection or combination of connections for delivering a signal or message from application 106 running in information processing system 101 to external system 140. For example, without limitation, connection 144 may comprise an appropriate network connection between information processing system 101 and a computer or other data processing system on which external system 140 is implemented.

Different actions 112, 114, 116, and 118 are performed by corresponding applications 102, 104, 106, and 108. In response to the occurrence of event 146. The occurrence of event 146 may be indicated by event information 148. Event information 148 may merely identify event 146 or otherwise indicate that event 146 has occurred. Alternatively, event information 148 may include additional information regarding event 146. Some or all of event information 148 may be used by applications 102, 104, 106, and 108 as input to perform corresponding actions 112, 114, 116, and 118.

Event information 148 indicating the occurrence of event 146 may be received by a first one of applications 102, 104, 106, and 108. For example, event information 148 may be received by application 102. Event information 148 may be received by application 102 in any appropriate manner. For example, operator 150 may provide event information 148 to information processing system 101 for use by application 102. Operator 150 may be a human operator, an automated device or system for providing event information 148, or a human operator in combination with an automated system. When operator 150 is a human operator, event information 148 may be provided to application 102 an appropriate user interface provided by application 102.

Upon receiving event information 148, application 102 may use event information 148 to perform actions 112. In accordance with an illustrative embodiment, application 102 may communicate event information 148 to other applications 104, 106, and 108 by publishing event information 148. For example, application 102 may include event publisher 152. Event publisher 152 may be configured to publish event information 148 in the form of event message 160. Event publisher 152 may be configured to generate event message 160 based on event information 148 and to publish event message 160 by sending event message 160 to event message pipeline 162. In this example, application 102 may be referred to as a publishing application.

Other applications 104, 106, and 108 may be configured to listen for the publication of event message 160 on event message pipeline 162. For example, applications 104, 106, and 108 may include corresponding event listeners 154, 156, and 158. Event listeners 154, 156, and 158 may be configured to listen for the publication of a relevant event message 160 on event message pipeline 162 and to receive a relevant event message from event message pipeline 162 in response to identifying the publication of the relevant event message 160 on event message pipeline 162. In this example, event message 160 is relevant to applications 104, 106, and 108 because corresponding actions 114, 116, and 118 are performed by applications 104, 106, and 108 in response to the occurrence of event 146 identified in event message 160. Therefore, in this example, event listeners 154, 156, and 158 will identify the publication of event message 160 on event message pipeline 162 and will receive event message 160 from event message pipeline 162. Applications 104, 106, and 108 then may perform corresponding actions 114, 116, and 118 using event information 148 from received event message 160. In this example, applications 104, 106, and 108 may be referred to as subscribing applications.

Event message 160 may include event name 164 and message payload 166. Event name 164 may be used by subscribing applications 104, 106, and 108 to identify the publication of relevant event message 160 on event pipeline 162. Message payload 166 may include some or all of event information 148 for event 146. Event message 160 also may include other information 168 as may be appropriate.

Event message pipeline 162 may be implemented in any appropriate manner. For example, event message pipeline 162 may be implemented as stream processing platform 170. For example, without limitation, event message pipeline 162 may be implemented using Apache Kafka open-source stream processing software platform or any other appropriate stream processing platform 170. Event message pipeline 162 may be implemented as part of information processing system 101. Alternatively, event message pipeline 162 may be implemented separate from information processing system 101, in whole or in part.

Figure 2:
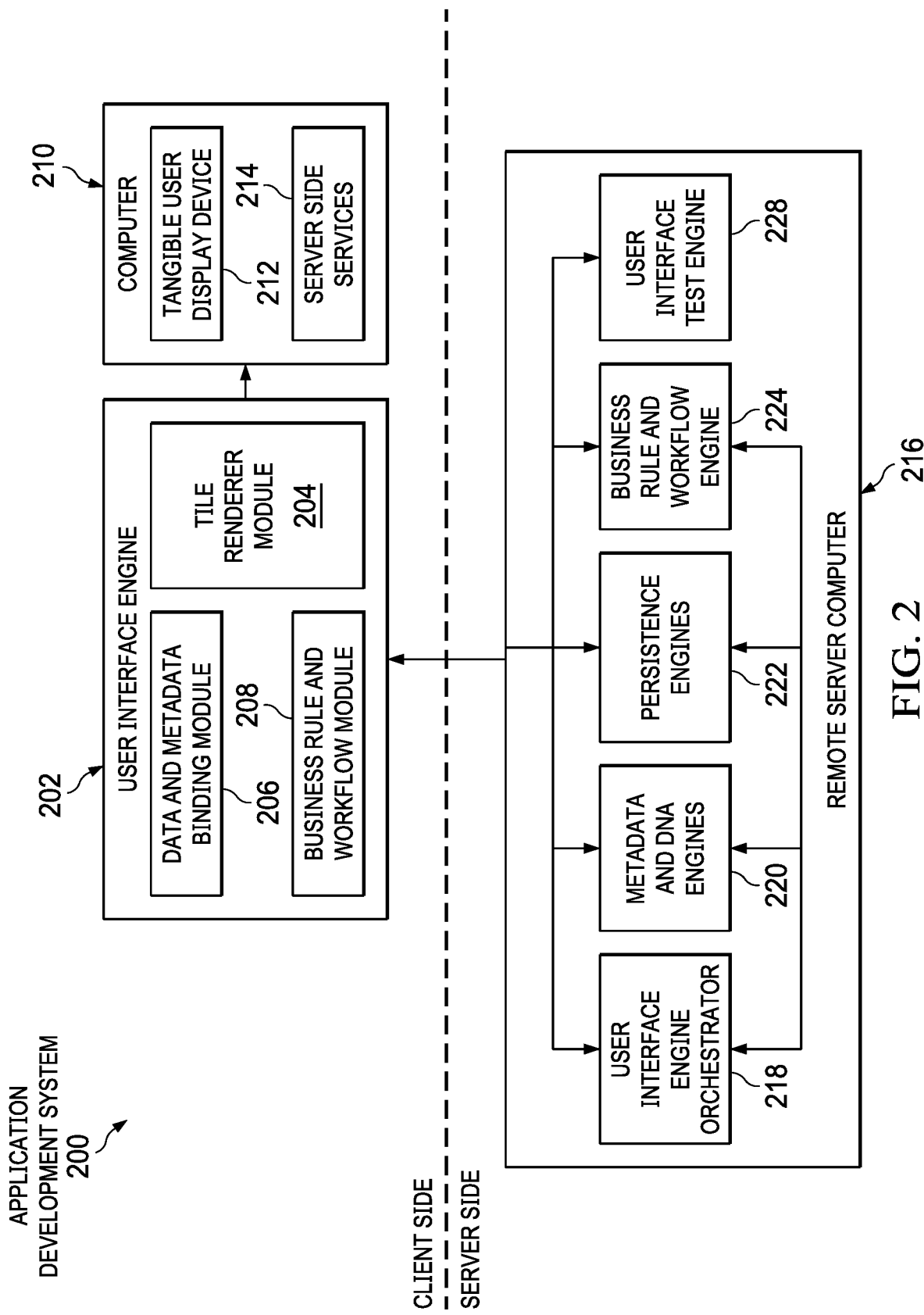
FIG. 2 is an illustration of a block diagram of an application development system in accordance with an illustrative embodiment.

With reference now to FIG. 2, an illustration of a block diagram of an application development system is depicted in accordance with an illustrative embodiment. Application development system 200 may be a development system that provides codeless development tools for combining distinct building blocks together to create, test, and use an application.

User interface engine 202 is computer code and underlying data and metadata which provides underlying functionality and implementation capability for the codeless development tools. From a software architecture viewpoint, user interface engine 202 is a client-side application, operating on a specific client user's computer. User interface engine 202 could be a Web browser or an extension to a Web browser, allowing for a user-friendly interface experience.

User interface engine 202 may be metadata driven. The metadata may describe a page and page layout of an overall web page without content. User interface engine 202 loads metadata for the page and then runs queries against local or remote databases to get customer data used for constructing applications. User interface engine 202 may then perform interpretation of the metadata and retrieved data, presenting an interface customized for each user.

The metadata may take the form of a document object model (DOM) tree composed of JSON (JavaScript Object Notation) objects, though metadata may be composed of multiple data models. The document object model tree is a tree representation of an abstract syntactic structure of source code, independent of any particular representation or encoding. Each node of the tree denotes a construct occurring in the source code. As opposed to parse trees, typically built by a parser during a source code translation and compiling process, the document object model tree can be "abstract," in that it is independent of any particular representation or encoding, and does not represent every detail appearing in the real syntax.

As depicted, user interface engine 202 may include three modules: tile renderer module 204, data and metadata binding module 206, and business rule and workflow module 208.

Tile renderer module 204 renders tiles on tangible user display device 212. Each tile represents a building block comprising a distinct, atomic unit of functionality executable by the computer. Tile renderer module 204 may receive input from the user, from data and metadata binding module 206, and from business rule and workflow module 208 to change and manipulate both the functionality of computer 210, which is used to execute tile renderer module 204, as well as tangible user display device 212, which is used to display rendered tiles.

Data and metadata binding module 206 binds data and metadata to the user interface, enabling user interface engine 202 to track the data and metadata used in executing business rules and rendering tiles.

Business rule and workflow module 208 enables creation of miniapps, collections, and bundles through the manipulation of tiles rendered by tile renderer module 204. Using data and metadata tracked by data and metadata binding module 206, business rule and workflow module 208 allows a user to develop software by manipulating tiles instead of writing code, thus enabling a codeless development environment from the perspective of the user.

In some illustrative embodiments, user interface engine 202 may take advantage of server side services operating on remote server computer 216. "Server side" means that computer 210 communicates with remote server computer 216, possibly over a network such as the Internet. Server side resources are often provided to support and enhance the functionality of user interface engine 202.

Server side resources may include user interface engine orchestrator 218. User interface engine orchestrator 218 may serve as a proxy to speed up processing of user interface engine 202. User interface engine orchestrator 218 may retrieve metadata and resolve data queries from a data center operating server side. User interface engine orchestrator 218 may cache retrieved data, metadata, code, workflows, or objects to be sent back to user interface engine 202. In some cases, user interface engine orchestrator 218 may execute code server side and return the results to speed up processing by user interface engine 202.

Server side services 214 may include one or more components. Metadata and DNA engines 220 manage or provide metadata for use in user interface engine 202. One or more of persistence engines 222 are provided for saving work done using user interface engine 202. Business rule and workflow engine 224 may be used to create or store business rules and workflows that are used by user interface engine 202 in building applications. User interface test engine 228 may be used to test both the functionality of user interface engine 202, as well as the created applications.

The illustrative embodiments may be varied and are not necessarily limited by the examples described with respect to FIG. 2. For example, other server side resources could be provided, such as, for example, a database of pre-prepared commonly used miniapps, collections, or bundles. In another example, user interface engine 202 may include other modules, such as an interface module that allows user interface engine 202 to interface with other new or existing software installed on computer 210.

Figure 3:
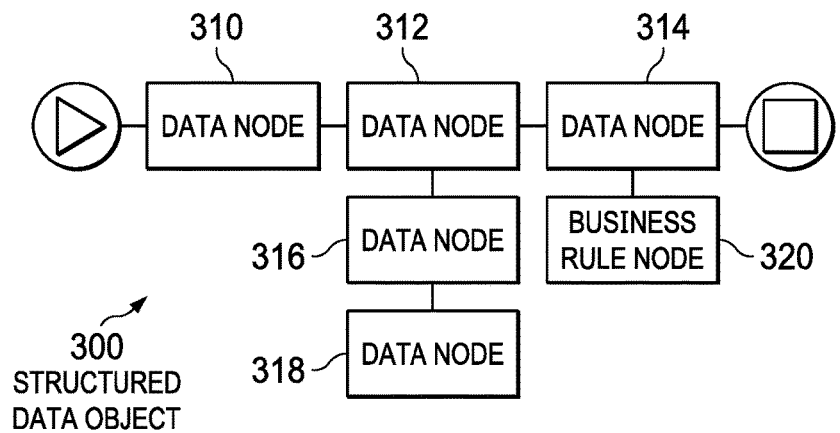
FIG. 3 is an illustration of a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain-specific language to create miniapps, collections, or bundles in a user-perceived codeless development environment.

Structured data object 300 includes data nodes 310, 312, and 314. Data nodes 310, 312, and 314 are well-defined structured data objects that can be manipulated within a data and structured data binding application to create desired business rules. Each of data nodes 310, 312, and 314 correlate to one or more functions, which in turn can be interpreted by metadata engine 220 of FIG. 2 for implementing the corresponding miniapps, collections, or bundles. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes business rule node 320. Business rule node 320 provides additional context for execution of related data node 314. Specifically, business rule node 320 may indicate a consuming service for receipt of business rule output provided by related data node 314. Business rule node 320 requests and returns information to a consuming service.

Figure 4:
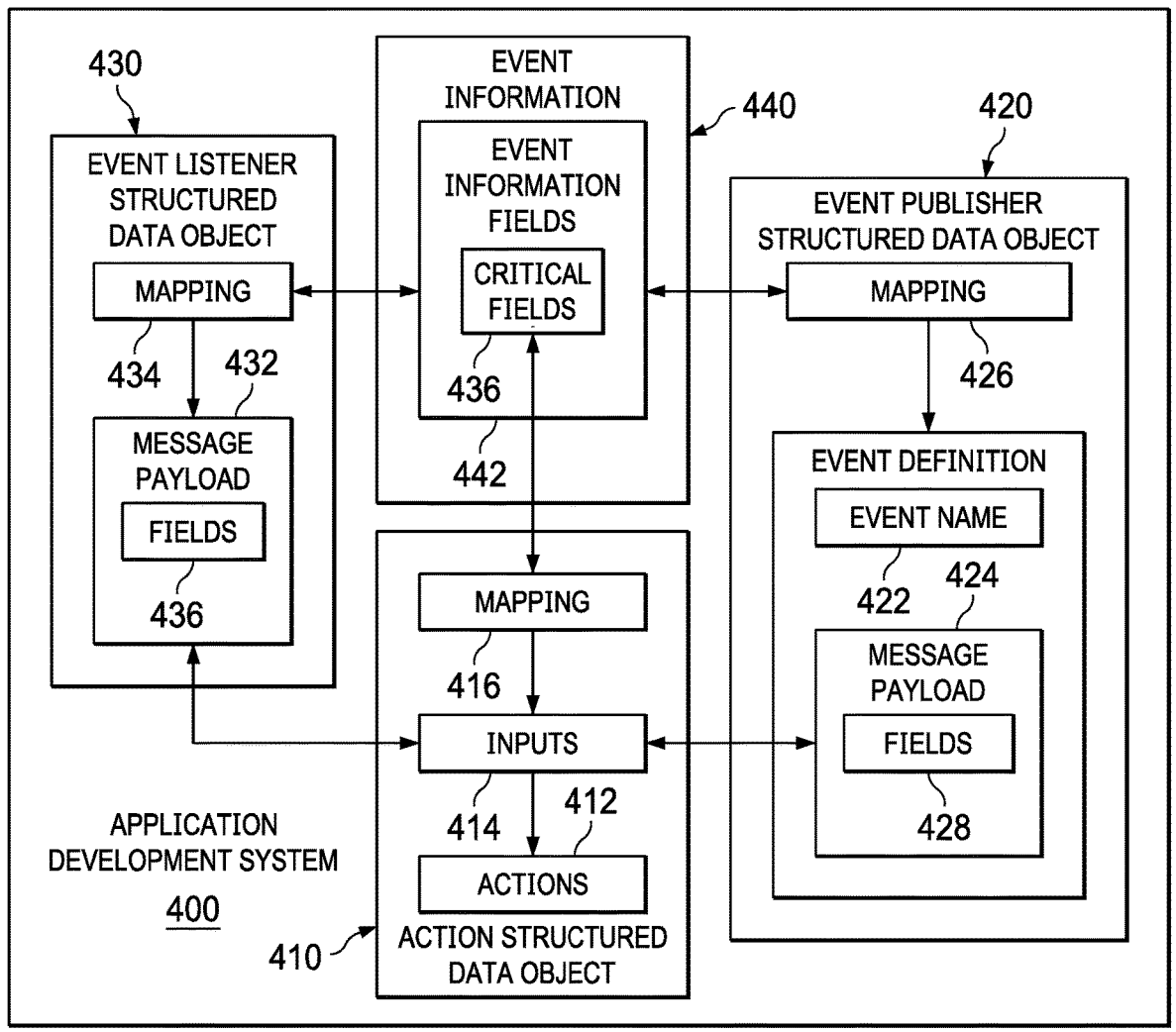
FIG. 4 is an illustration of a block diagram of an application development system in accordance with an illustrative embodiment.

Turning to FIG. 4, an illustration of a block diagram of an application development system is depicted in accordance with an illustrative embodiment. Application development system 400 can be application development system 200 of FIG. 2, and may be used by an operator to develop applications, such as applications 102, 104, 106 and 108 of FIG. 1.

Application development system 400 can include one or more structured data objects that can be linked together according to a domain-specific language to create miniapps, collections, or bundles in a user-perceived codeless development environment. As depicted, application development system 400 may include action structured data object 410, event publisher structured data object 420, and event listener structured data object 430. Each of structured data object 410, 420, and 430 is an example of a structured data object, such as structured data object 300 of FIG. 3.

Action structured data object 410 may be configured to define actions 412 that are performed in response to the occurrence of an event. Action structured data object 410 may be used to define event information 440 for an event that is used as inputs 414 for performing actions 412. For example, action structured data object 410 may be used for mapping 416 specific ones of event information fields 442 in which specific ones of event information 440 will be received to specific corresponding ones of inputs 414 for performing actions 412.

Event publisher structured data object 420 may be configured to define an event message that will be published by an event publisher in an application in response to receiving event information 440. Event publisher structured data object 420 may be used to define event name 422 and message payload 424 for the event message. For example, event publisher structured data object 420 may be used for mapping 426 event information fields 442 to appropriate corresponding fields 428 in message payload 424.

Event listener structured data object 430 may be configured to define how event information 440 that is received in message payload 432 of an event message is used to perform actions 412 by an application. For example, event listener structured data object 430 may be used for mapping 434 fields 436 in message payload 432 to corresponding appropriate inputs 414 for performing actions 412 by an application.

Figure 5:
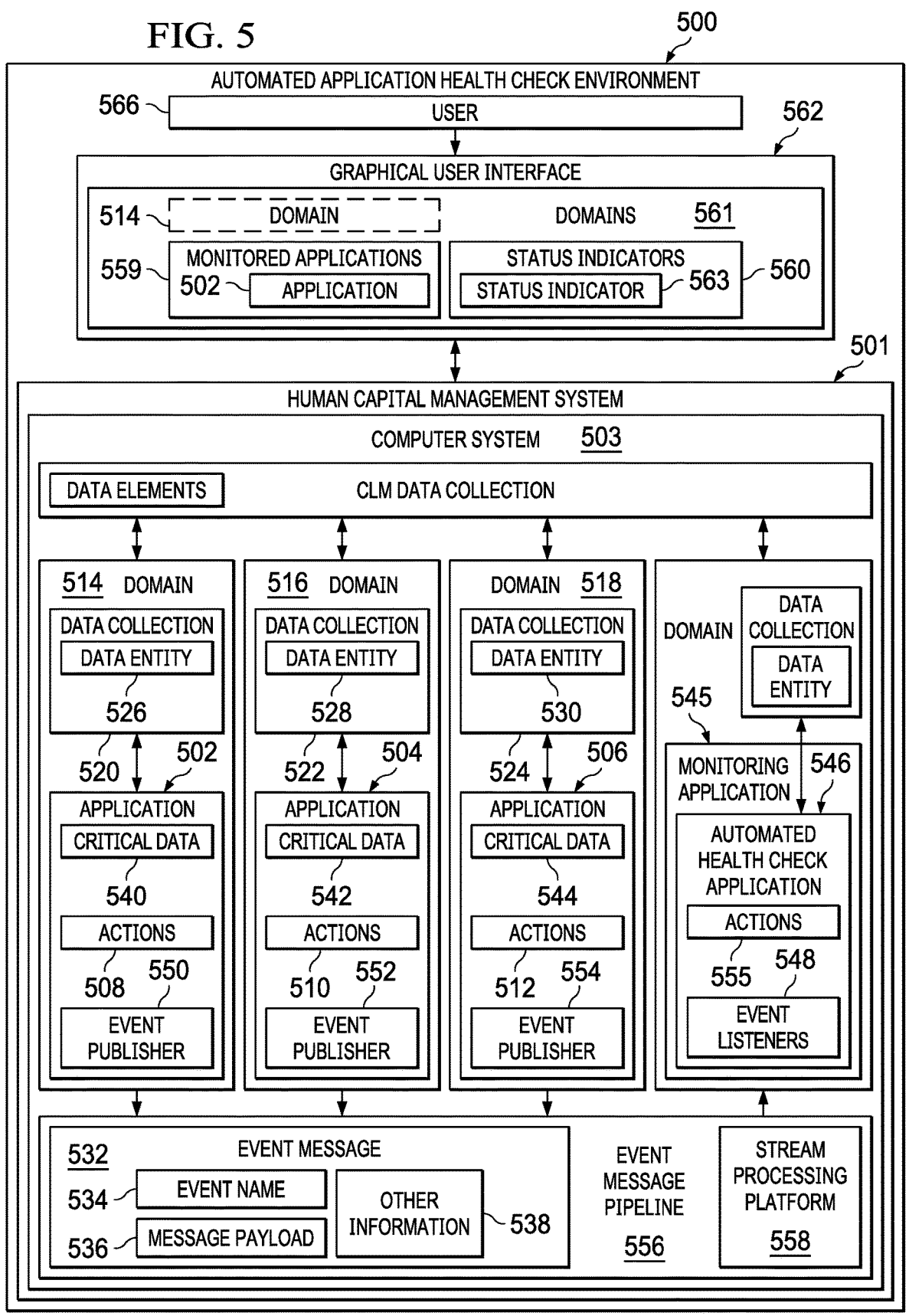
FIG. 5 is an illustration of a block diagram of an automated application health check environment in accordance with an illustrative embodiment.

Turning to FIG. 5, an illustration of a block diagram of an automated application health check is depicted in accordance with an illustrative embodiment. Automated application health check environment 500 may comprise human capital management system 501. As depicted, human capital management system 501 includes computer system 503. Computer system 503 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

Automated application health check environment 500 may be any appropriate environment in which a plurality of applications 502, 504, and 506 are run to perform a plurality of corresponding actions 508, 510, and 512. An event communication environment in accordance with an illustrative embodiment may include more or fewer applications to perform more or fewer actions than are illustrated as an example in FIG. 5. An event communication environment in accordance with an illustrative embodiment may include any appropriate number of applications to perform any appropriate number of actions.

One or more of applications 502, 504, and 506 may be implemented as miniapps, such as one or more of miniapps 122, 124, 126, and 128 of FIG. 1. For example, without limitation, one or more of applications 502, 504, and 506 can be used to perform corresponding actions 508, 510, and 512 by or for a business or other entity. The miniapps may be built using one or more structured data objects, such as structured data object 300 of FIG. 3.

Applications 502, 504, and 506 running in human capital management system 501 may perform any corresponding actions 508, 510, and 512 that are appropriate for the entity for which human capital management system 501 is operated. For example, without limitation, when human capital management system 501 is operated by or for a business entity, applications 502, 504, and 506 may perform corresponding actions 508, 510, and 512 that are related to managing the human resources of the business entity. In this case, applications 502, 504, and 506 running on human capital management system 501 may implement a human capital management system for the business entity.

In accordance with an illustrative embodiment, applications 502, 504, and 506 perform corresponding actions 508, 510, and 512 in different corresponding domains 514, 516, and 518. Each of domains 514, 516, and 518 may include corresponding application 502, 504, or 506, as well as one or more other applications, not shown in FIG. 5, for performing other actions in domain 514, 516, or 518.

In accordance with an illustrative embodiment, each of domains 514, 516, and 518 may be directed to a different business entity, or a different organizational aspect of the business entity. For example, without limitation, each of domains 514, 516, and 518 may be directed to a different organization, product, associate, person, account, identity provider, or other suitable aspect of the business entity within the execution context defined by the corresponding domain. In this illustrative example, each of domains 514, 516, and 518 is designed as a single MicroService that can be developed, tested, and deployed separately from other ones of domains 514, 516, and 518.

In accordance with an illustrative embodiment, each of domains 514, 516, and 518 has its own data collection 520, 522, and 524. Each of data collection 520, 522, and 524, respectively stores one or more data entity 526, 528, 530, that relate to applications within corresponding domains 514, 516, and 518. In this illustrative embodiment, each data entity 526, 528, 530 is stored as a standalone JSON document having a universal unique identifier (UUID) that serves as a primary search key for the document, and can be used as a sharding key for a database sharding policy.

Different ones of actions 508, 510, and 512 performed by corresponding applications 502, 504, and 506 may trigger the publication of event message 532. Event information contained in one or more of event name 534, message payload 536, or other information 538 may merely identify an event or otherwise indicate that an event has occurred. Alternatively, one or more of event name 534, message payload 536, or other information 538 may include additional information that may be used by applications 502, 504, and 506 as input to perform corresponding actions 508, 510, and 512, respectively.

In one illustrative example, one or more of applications 502, 504, and 506 may perform corresponding actions 508, 510, and 512, with respect to critical data 540, 542, and 544. Critical data 540, 542, and 544 is data, such as data entities 526, 528, 530, that is required by the corresponding applications 502, 504, and 506.

Applications 502, 504, and 506 may generate event message 532 when critical data 540, 542, and 544 is unavailable. In this illustrative example, message payload 536 may comprise event information that indicates the corresponding applications 502, 504, and 506 and an execution context of the corresponding applications 502, 504, and 506.

In accordance with an illustrative embodiment, a human capital management system 501 includes monitoring application 545. Monitoring application 545 may be implemented as miniapps, such as one or more of miniapps 122, 124, 126, and 128 of FIG. 1. For example, without limitation, monitoring application 545 may be used to perform corresponding actions 548 by or for a business or other entity. The miniapps may be built using one or more structured data objects, such as structured data object 300 of FIG. 3.

Applications 502, 504, and 506 may communicate event information to automated health check application 546 by publishing event information in the form of event message 532. A corresponding event publisher 550, 552, and 554 may be configured to publish event message 532 to event message pipeline 556. In this example, applications 502, 504, and 506 may be referred to as publishing applications.

Event message 532 may include event name 534 and message payload 536. Event name 534 may be used by automated health check application 546 to identify the publication of relevant event message 532 on event message pipeline 556. Message payload 536 may include some or all of event information as well as other information 538 as may be appropriate.

Event message pipeline 556 may be implemented in any appropriate manner. For example, event message pipeline 556 may be implemented as stream processing platform 558. For example, without limitation, event message pipeline 556 may be implemented using Apache Kafka open-source stream processing software platform or any other appropriate stream processing platform 558. Event message pipeline 556 may be implemented as part of human capital management system 501. Alternatively, event message pipeline 556 may be implemented separate from human capital management system 501, in whole or in part.

In this illustrative example, monitoring application 545 can be implemented as automated health check application 546 and can be configured to listen for the publication of event message 532 on event message pipeline 556. For example, monitoring application 545 may include corresponding event listeners 555. Event listeners 555 may be configured to listen for the publication of a relevant event message, and to receive a relevant message in response to identifying the publication. In this example, event message 532 is relevant because corresponding actions 548 are performed by monitoring application 545 in response to the occurrence of an event identified in event message 532. Monitoring application 545 may then perform corresponding actions 548 using event information contained in event message 532. In this example, monitoring application 545 may be referred to as a subscribing application.

By implementing application monitoring in the manner described, monitoring application 545 is able to be critical data agnostic. Critical data 540, 542, and 544 is defined within applications 502, 504, and 506. Monitoring application 545 interprets the event information within the execution context of an application being monitored, enabling monitoring application 545 to be unaware of critical data 540, 542, and 544 that may be required by applications 502, 504, and 506. Because critical data 540, 542, and 544 is defined within applications 502, 504, and 506, applications can be developed in the federated manner, without regard to the criticality of different data for different applications.

In one or more illustrative examples, graphical user interface 562 displays monitored applications 559, which can be one or more of applications 502, 504, and 506, across their corresponding domains 561, which can be one or more of domains 514, 516, and 518. Monitored applications 559 are displayed in association with status indicators 560. Status indicators 560 may indicate a status of monitored applications 559 based on, for example, the availability of critical data.

Monitoring application 545 updates status indicator 563 of monitored applications 559 based on the event information interpreted within the execution context of the corresponding domains 561. Monitoring application 545 updates status indicator 563 of monitoring application 545 within the execution context of the corresponding domain, but not within other execution contexts for other ones of domains 561.

For example, when event message 532 is published by application 502, monitoring application 545 updates status indicator 563 to indicate the status of application 502 in domain 514; monitoring application 545 does not update status indicator 560 in other ones of domains 561.

Status indicator 560 can be a control displayed within graphical user interface 562 of display system 564. A control is a graphical and/or functional element that can be reused across graphical user interface (GUI) applications and which the user can select and activate to get additional information. A control, in a graphical user interface, is an object on the screen that can be manipulated by the user to perform some action. A button is a common type of control.

User 566 can interact with status indicator 560 to perform administrative actions that are permitted according to the status of applications 502, 504, and 506, as identified from information in event message 532.

Figure 6:
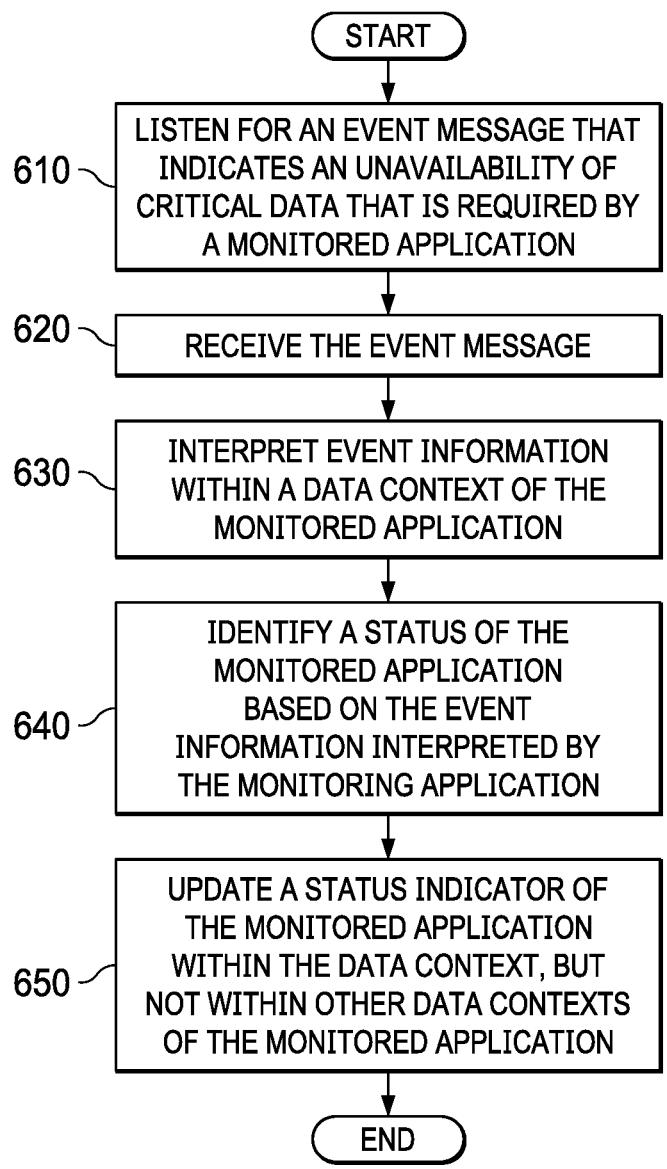
FIG. 6 is a flowchart of a process for managing application availability in a micro services environment in accordance with an illustrative embodiment.

With reference next to FIG. 6, a flowchart of a process for managing application availability in a micro services environment is depicted in accordance with an illustrative embodiment. Process 600 can be a software process, implemented in one or more components, such as automated health check application 546 of FIG. 5.

The process begins by listening for an event message that indicates an unavailability of critical data that is required by a monitored application (step 610). The event message can be event message 532 of FIG. 5, and comprises an event name and a message payload. The message payload can be message payload 536 of FIG. 5 and comprises event information that indicates the monitored application and an execution context of the monitored application. The monitored application can be one of applications 502, 504, or 506 of FIG. 5. The monitored application comprises a first set of data nodes that are composed into a first structured data object according to a domain-specific language, such as structured data object 300 of FIG. 3.

The process receives the event message (step 620). The event message is received by the monitoring application over a message pipeline, such as message pipeline 556 of FIG. 5. The monitoring application, such as automated health check application 546 of FIG. 5, is critical data agnostic, such that the monitoring application is unaware of the critical data required by the monitored application. The monitoring application comprises a second set of data nodes that are composed into a second structured data object according to the domain-specific language, such as structured data object 300 of FIG. 3.

Responsive to receiving the event message, the process interprets event information within an execution context of the monitored application (step 630). Based on the event information interpreted by the monitoring application, the process identifies a status of the monitored application (step 640).

The process updates a status indicator of the monitored application within the execution context, but not within other execution contexts of the monitored application (step 650), with the process terminating thereafter. The status indicator can be status indicator 560 of FIG. 5.

Figure 7:
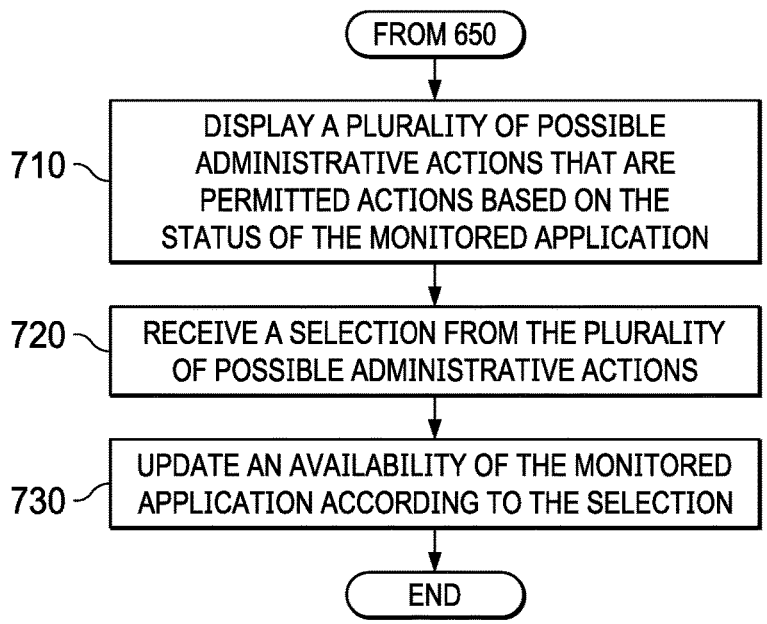
FIG. 7 is a flowchart of a process for managing application availability in a micro services environment in accordance with an illustrative embodiment.

With reference next to FIG. 7, a flowchart of a process for managing application availability in a micro services environment is depicted in accordance with an illustrative embodiment. Process 700 can be a software process, implemented in one or more components, such as automated health check application 546 of FIG. 5.

Continuing from step 650 of FIG. 6, process 700 displays a plurality of possible administrative actions that are permitted actions based on a status of a monitored application (step 710). The permitted actions can be displayed on a graphical user interface, such as graphical user interface 562 of FIG. 5.

The process receives a selection from the plurality of possible administrative actions (step 720). The selection is can be input from a user interacting with control elements in a graphical user interface, such a status indicator 560 of FIG. 5.

The process updates an availability of the monitored application according to the selection (step 730), with the process terminating thereafter. The availability of the application is updated within the execution context, but not within other execution contexts of the monitored application.

Figure 8:
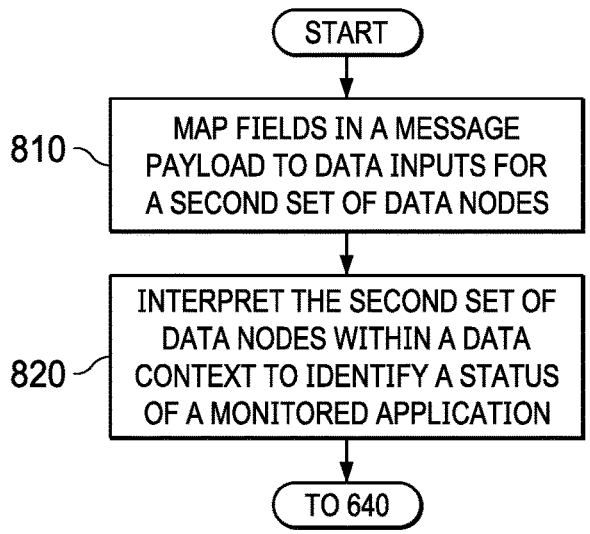
FIG. 8 is a flowchart of a process for interpreting event information in accordance with an illustrative embodiment.

With reference next to FIG. 8, a flowchart of a process for interpreting event information is depicted in accordance with an illustrative embodiment. Process 800 is a more detailed depiction of step 630 of FIG. 6.

The process maps fields in a message payload to data inputs for a second set of data nodes (step 810). The process interprets the second set of data nodes within an execution context to identify a status of a monitored application (step 820). Thereafter, the process can continue as described in step 640 of FIG. 6.

Figure 9:
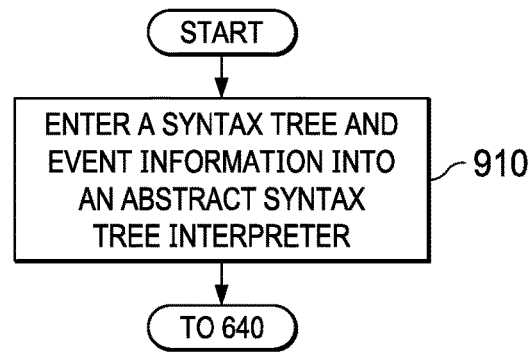
FIG. 9 is another flowchart of a process for interpreting event information in accordance with an illustrative embodiment.

With reference next to FIG. 9, a flowchart of a process for interpreting event information is depicted in accordance with an illustrative embodiment. Process 900 is a more detailed depiction of step 630 of FIG. 6.

In this illustrative example, a set of data nodes forms a syntax tree. The process enters a syntax tree and event information into an abstract syntax tree interpreter (step 910). A compiler operation to generate computer code for implementing the monitoring action is avoided. Executing the abstract syntax tree interpreter produces a result without using executable code to achieve the result. The process then continues as described in step 640 of FIG. 6.

Figure 10:
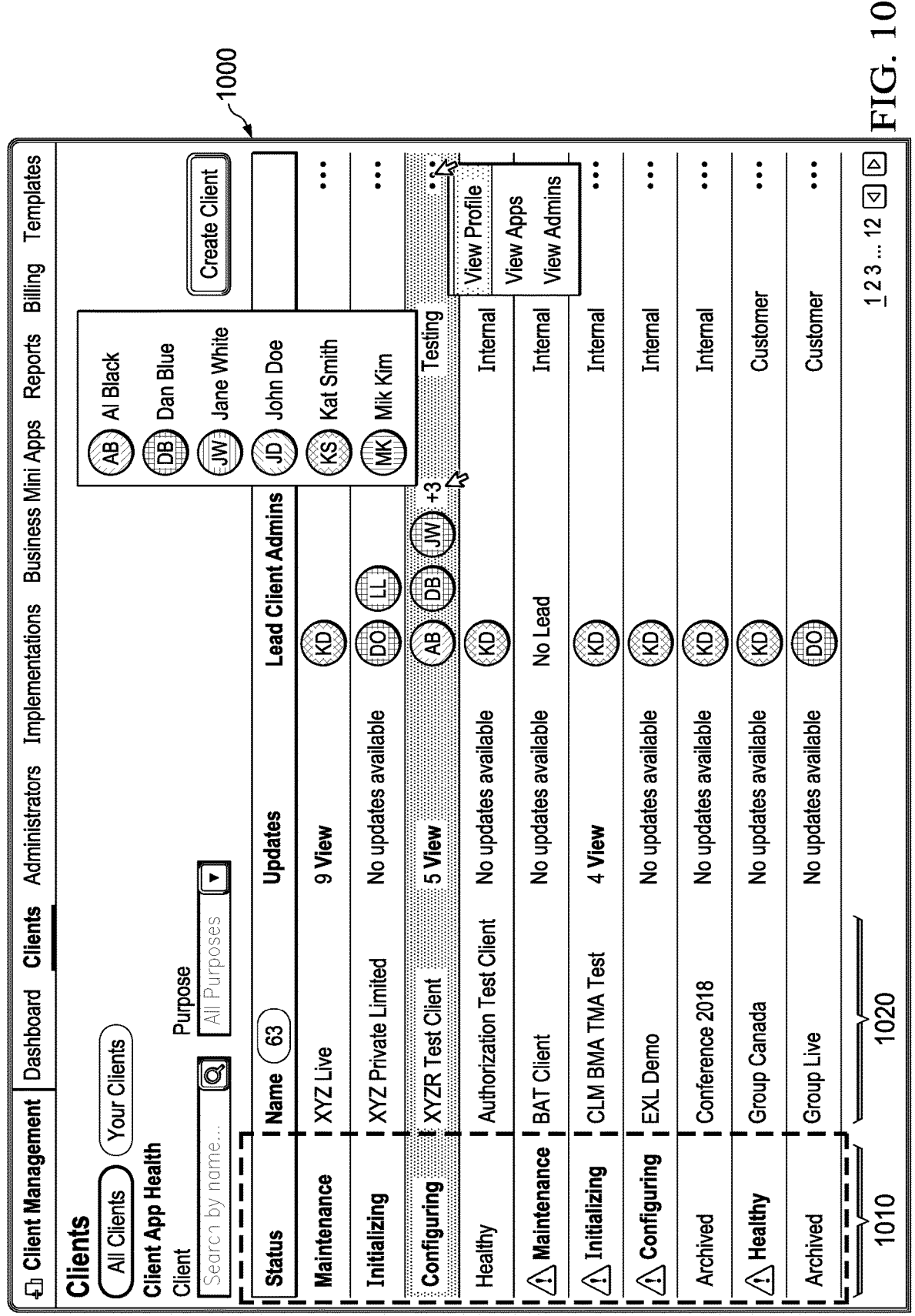
FIG. 10 is a graphical user interface for managing application availability in a micro services environment in accordance with an illustrative embodiment.

With reference next to FIG. 10, a graphical user interface for managing application availability in a micro services environment is depicted in accordance with an illustrative example. Graphical user interface 1000 is an example of graphical user interface 562, shown in block form in of FIG. 5.

As depicted, graphical user interface 1000 illustrates statuses 1010 for a plurality of clients 1020. Each of clients 1020 is a consumer of one or more micro services. Each of statuses 1010 can be determined based on the availability of critical data, such as described above in FIG. 5.

Figure 11:
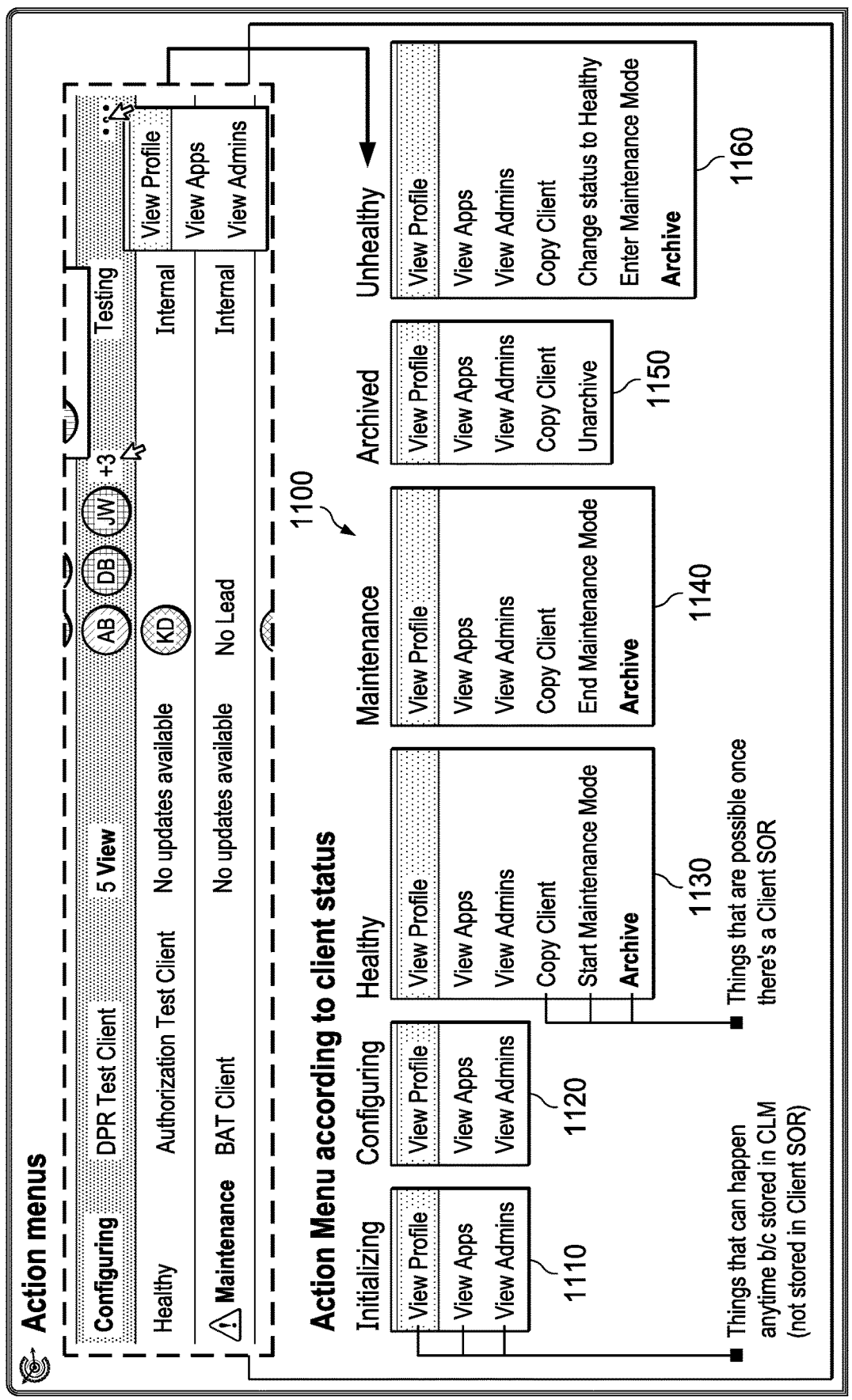
FIG. 11 is a number of client statuses shown in accordance with an illustrative embodiment.

With reference next to FIG. 11, a number of client statuses is depicted in accordance with an illustrative embodiment. Client statuses 1100 are examples of statuses of a monitored application, such as statuses 1010 of FIG. 10.

In this illustrative example, statuses 1100 are based on event information received from the monitored application, and interpreted by the monitoring application. Statuses 1100 can include, for example, but not limited to, initializing, configuring, healthy, maintenance, archived, and unhealthy.

In this illustrative example, different administrative actions are permitted actions based on the status of the monitored application. A graphical user interface, such as graphical user interface 1000 of FIG. 10, can display a plurality of possible administrative actions in response to a user interaction with a status indicator.

Pop-up window 1110 lists different administrative actions that are permitted based on an "initializing" status. As depicted, pop-up window 1110 includes administrative actions that do not require the provisioning of a data collection for the corresponding domain, such as view profile, view applications, and view administrators.

Pop-up window 1120 lists different administrative actions that are permitted based on a "configuring" status. As depicted, pop-up window 1120 includes administrative actions that do not require critical data elements to be stored in the data collection for the corresponding domain, such as view profile, view applications, and view administrators.

Pop-up window 1130 lists different administrative actions that are permitted based on a "healthy" status. As depicted, pop-up window 1130 includes administrative actions that do not require the provisioning of a data collection for the corresponding domain, such as view profile, view applications, and view administrators. Additionally, pop-up window 1130 includes administrative actions that can only be performed after provisioning a data collection for the corresponding domain, such as copy client, start maintenance mode, and archive.

Pop-up window 1140 lists different administrative actions that are permitted based on a "maintenance" status. As depicted, pop-up window 1140 includes administrative actions that do not require the provisioning of a data collection for the corresponding domain, such as view profile, view applications, and view administrators. Additionally, pop-up window 1140 includes administrative actions that can only be performed after provisioning a data collection for the corresponding domain, such as copy client, end maintenance mode, and archive.

Pop-up window 1150 lists different administrative actions that are permitted based on an "archived" status. As depicted, pop-up window 1150 includes administrative actions that do not require the provisioning of a data collection for the corresponding domain, such as view profile, view applications, and view administrators. Additionally, pop-up window 1150 includes administrative actions that can only be performed after provisioning a data collection for the corresponding domain, such as copy client, and unarchive.

Pop-up window 1160 list different administrative actions that are permitted based on an "unhealthy" status. As depicted, pop-up window 1160 includes administrative actions that do not require the provisioning of a data collection for the corresponding domain, such as view profile, view applications, and view administrators. Additionally, pop-up window 1160 includes administrative actions that can only be performed after provisioning a data collection for the corresponding domain, such as copy client, change status to healthy, enter maintenance mode, and archive.

Figure 12:
FIG. 12 is a client profile page of a graphical user interface in accordance with an illustrative embodiment.

With reference next to FIG. 12, a client profile page of a graphical user interface is depicted in accordance with an illustrative embodiment. Client profile page 1200 can be displayed in response to a selection of a corresponding administrative action from one of pop-up windows 1110-1160 of FIG. 11.

With reference next to FIGS. 13A-13B, an application health page of a graphical user interface is depicted in accordance with an illustrative embodiment. Application health page 1300 can be displayed in response to a selection of a corresponding control element from graphical user interface 1000 of FIG. 10.

As depicted, a plurality of human capital management services are provided to clients in a micro services environment. The applications provided to different clients can include the as-depicted services of human resources, payroll, compliance, compensation, time off, time on, benefits, and talent, as well as other services not illustrated in application health page 1300. Each of the applications is an example of applications 502, 504, and 506, shown in block form in FIG. 5.

In this illustrative example, the applications for each different client are executed within different domains, such that the different clients define a different execution context for the applications in the corresponding domain. Additionally, the execution context can be further constrained within the different clients, such as by constraining the data according to a particular geographic characteristic, as depicted.

Turning to FIG. 14, an illustration of block diagram of a data processing system is depicted in accordance with an illustrative embodiment. Data processing system 1400 in FIG. 14 is an example of a data processing system that may be used to implement the illustrative embodiments, such as in FIG. 1 through FIG. 3, or any other module or system or process disclosed herein. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. This software may be an associative memory, content addressable memory, or software for implementing the processes described elsewhere herein. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer-readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output (I/O) unit 1412 allows for input and output of data with other devices that may be connected to data processing system 1400. For example, input/output (I/O) unit 1412 may provide a connection for user input through a keyboard, a mouse, and/or some other suitable input device. Further, input/output (I/O) unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these examples. In one example, computer-readable media 1420 may be computer-readable storage media 1424 or computer-readable signal media 1426. Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer-readable storage media 1424 may not be removable from data processing system 1400.

Alternatively, program code 1418 may be transferred to data processing system 1400 using computer-readable signal media 1426. Computer readable signal media 1426 may be, for example, a propagated data signal containing program code 1418. For example, computer-readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer-readable signal media 1426 for use within data processing system 1400. For instance, program code stored in a computer-readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1418 may be omitted because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

As another example, a storage device in data processing system 1400 is any hardware apparatus that may store data. Memory 1406, persistent storage 1408, and computer-readable media 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406, or a cache, such as found in an interface and memory controller hub that may be present in communications fabric 1402.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer-readable medium providing program code for use by or in connection with a computer or any device or system that executes instructions. For the purposes of this disclosure, a computer usable or computer-readable medium can generally be any tangible apparatus that can contain, store, communicate, propagate, or transport the program for use by or in connection with the instruction execution system, apparatus, or device.

The computer usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer-readable medium may contain or store a computer-readable or computer usable program code such that when the computer-readable or computer usable program code is executed on a computer, the execution of this computer-readable or computer usable program code causes the computer to transmit another computer-readable or computer usable program code over a communications link. This communications link may use a medium that is, for example without limitation, physical or wireless.

A data processing system suitable for storing and/or executing computer-readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing application availability in a micro services environment, the method comprising:
   listening, by a monitoring application in a computer system, to a message pipeline for an event message, wherein the event message is generated by a monitored application when critical data is unavailable, wherein the monitoring application is critical data agnostic such that the monitoring application is unaware of the critical data required by the monitored application, and wherein the monitoring application comprises a first set of data nodes that are composed into a first structured data object according to a domain specific language;
   receiving, by the monitoring application in the computer system, the event message over the message pipeline, wherein the event message comprises an event name and a message payload, wherein the message payload comprises event information that indicates the monitored application and an execution context of the monitored application, and wherein the monitored application comprises a second set of data nodes that are composed into a second structured data object according to the domain specific language;
   responsive to receiving the event message, interpreting, by the monitoring application in the computer system, the event information within the execution context of the monitored application, wherein interpreting the event information further comprises:
      mapping fields in the message payload to data inputs for the second set of data nodes, wherein the second set of data nodes forms a syntax tree;
      entering the syntax tree and event information into an abstract syntax tree interpreter; and
      interpreting the second set of data nodes within the execution context to identify the status of the monitored application;
   identifying, by the monitoring application in the computer system, a status of the monitored application based on the event information interpreted by the monitoring application; and
   updating, by the monitoring application in the computer system, a status indicator of the monitored application within the execution context, but not within other execution contexts of the monitored application.

2. The method of claim 1, wherein the status indicator is a graphical indication of a current status of the monitored application, the method further comprising:
   displaying, by the monitoring application, a plurality of possible administrative actions that are permitted actions based on the status of the monitored application;
   receiving, by the monitoring application, a selection from the plurality of possible administrative actions; and
   updating, by the monitoring application, an availability of the monitored application according to the selection, wherein the availability is updated within the execution context, but not within other execution contexts of the monitored application.

3. The method of claim 2, wherein the permitted actions are selected from the plurality of possible administrative actions consisting of view profile, view applications, view administrators, copy client, start maintenance mode, end maintenance mode, archive, unarchive, change status to healthy, and enter maintenance mode.

4. The method of claim 1, wherein the event name is associated with an indication of the unavailability of the critical data.

5. The method of claim 1, wherein the message pipeline is a stream processing platform.

6. The method of claim 1, wherein the monitored application is a first miniapp in a human capital management system.

7. The method of claim 1, wherein the status of the monitored application is selected from a plurality of statuses consisting of initializing, configuring, healthy, maintenance, archived, and unhealthy.

8. A computer system for managing application availability in a micro services environment, the computer system comprising:
   a set of hardware processors;
   a monitored application comprising a first set of data nodes that are composed into a first structured data object according to a domain-specific language; and
   a monitoring application comprising a second set of data nodes that are composed into a second structured data object according to the domain-specific language, wherein the monitoring application is configured:
      to listen to a message pipeline for an event message, wherein the event message is generated by the monitored application when critical data is unavailable, wherein the monitoring application is critical data agnostic such that the monitoring application is unaware of the critical data required by the monitored application, and wherein the monitoring application comprises a first set of data nodes that are composed into a first structured data object according to a domain specific language;
      to receive the event message over a message pipeline, wherein the event message comprises an event name and a message payload, wherein the message payload comprises event information that indicates the monitored application and an execution context of the monitored application;
      responsive to receiving the event message, to interpret the event information within the execution context of the monitored application, wherein interpreting the event information further comprises:
         mapping fields in the message payload to data inputs for the second set of data nodes, wherein the second set of data nodes forms a syntax tree;
         entering the syntax tree and event information into an abstract syntax tree interpreter; and
         interpreting the second set of data nodes within the execution context to identify the status of the monitored application;
      to identify a status of the monitored application based on the event information interpreted by the monitoring application; and
      to update a status indicator of the monitored application within the execution context, but not within other execution contexts of the monitored application.

9. The computer system of claim 8, wherein the status indicator is a graphical indication of a current status of the monitored application, the monitoring application is further configured:
   to display a plurality of possible administrative actions that are permitted actions based on the status of the monitored application;
   to receive a selection from the plurality of possible administrative actions; and to update an availability of the monitored application according to the selection, wherein the availability is updated within the execution context, but not within other execution contexts of the monitored application.

10. The computer system of claim 9, wherein the permitted actions are selected from the plurality of possible administrative actions consisting of view profile, view applications, view administrators, copy client, start maintenance mode, end maintenance mode, archive, unarchive, change status to healthy, and enter maintenance mode.

11. The computer system of claim 8, wherein the event name is associated with an indication of the unavailability of the critical data.

12. The computer system of claim 8, wherein the message pipeline is a stream processing platform.

13. The computer system of claim 8, wherein the monitored application is a first miniapp in a human capital management system.

14. The computer system of claim 8, wherein the status of the monitored application is selected from a plurality of statuses consisting of initializing, configuring, healthy, maintenance, archived, and unhealthy.

15. A computer program product for managing application availability in a micro services environment comprising:
 a non-transitory computer-readable storage media;
 program code, stored on the computer-readable storage media, for listening, by a monitoring application, to a message pipeline for an event message, wherein the event message is generated by a monitored application when critical data is unavailable, wherein the monitoring application is critical data agnostic such that the monitoring application is unaware of the critical data required by the monitored application, and wherein the monitoring application comprises a first set of data nodes that are composed into a first structured data object according to a domain specific language;
 program code, stored on the computer-readable storage media, for, by the monitoring application in the computer system, the event message over the message pipeline, wherein the event message comprises an event name and a message payload, wherein the message payload comprises event information that indicates the monitored application and an execution context of the monitored application, and wherein the monitored application comprises a second set of data nodes that are composed into a second structured data object according to the domain specific language;
 program code, stored on the computer-readable storage media, for interpreting, by the monitoring application and in response to receiving the event message, the event information within the execution context of the monitored application, wherein the program code for interpreting the event information further comprises:
  code for mapping fields in the message payload to data inputs for the second set of data nodes, wherein the second set of data nodes forms a syntax tree;
  code for entering the syntax tree and event information into an abstract syntax tree interpreter; and
  code for interpreting the second set of data nodes within the execution context to identify the status of the monitored application; program code, stored on the computer-readable storage media, for identifying a status of the monitored application based on the event information interpreted by the monitoring application; and
 program code, stored on the computer-readable storage media, for updating, by the monitoring application, a status indicator of the monitored application within the execution context, but not within other execution contexts of the monitored application.

16. The computer program product of claim 15, wherein the status indicator is a graphical indication of a current status of the monitored application, the computer program product further comprising:
 program code, stored on the computer-readable storage media, for displaying, by the monitoring application, a plurality of possible administrative actions that are permitted actions based on the status of the monitored application;
 program code, stored on the computer-readable storage media, for receiving, by the monitoring application, a selection from the plurality of possible administrative actions; and
 program code, stored on the computer-readable storage media, for updating, by the monitoring application, an availability of the monitored application according to the selection, wherein the availability is updated within the execution context, but not within other execution contexts of the monitored application.

17. The computer program product of claim 16, wherein the permitted actions are selected from the plurality of possible administrative actions consisting of view profile, view applications, view administrators, copy client, start maintenance mode, end maintenance mode, archive, unarchive, change status to healthy, and enter maintenance mode.

18. The computer program product of claim 15, wherein the event name is associated with an indication of the unavailability of the critical data.

19. The computer program product of claim 15, wherein the message pipeline is a stream processing platform.

20. The computer program product of claim 15, wherein the monitored application is a first miniapp in a human capital management system.

21. The computer program product of claim 15, wherein the status of the monitored application is selected from a plurality of statuses consisting of initializing, configuring, healthy, maintenance, archived, and unhealthy.

\* \* \* \* \*